United States Patent
Renko et al.

[19]

[11] Patent Number: 6,002,948

[45] Date of Patent: Dec. 14, 1999

[54] METHOD AND APPARATUS FOR RADIO SYSTEM WITH MODE BASED SUBSCRIBER COMMUNICATIONS

[75] Inventors: Mitchell E. Renko, Davie; David R. Heeschen, Coconut Creek; Audrey Longhurst, Weston, all of Fla.

[73] Assignee: Motorola, Inc., Schaumburg, Ill.

[21] Appl. No.: 08/811,064

[22] Filed: Mar. 3, 1997

[51] Int. Cl.[6] .................................................. H04Q 7/32
[52] U.S. Cl. ............................................................ 455/567
[58] Field of Search ........................... 395/186; 455/520, 455/414, 510, 426, 517, 412, 17, 466, 553; 379/88.03; 370/277, 279, 337

[56] References Cited

U.S. PATENT DOCUMENTS

| | | |
|---|---|---|
| 5,200,957 | 4/1993 | Dahlin . |
| 5,457,735 | 10/1995 | Erickson et al. ............................ 379/58 |
| 5,548,631 | 8/1996 | Krebs et al. ................................ 379/58 |
| 5,594,779 | 1/1997 | Goodman . |
| 5,737,706 | 4/1998 | Seazholtz et al. . |
| 5,797,103 | 8/1998 | Duda ....................................... 455/567 |
| 5,819,184 | 10/1998 | Cashman ................................... 455/553 |
| 5,881,060 | 3/1999 | Morrow et al. ........................... 370/337 |

FOREIGN PATENT DOCUMENTS

WO96/41491  12/1996  WIPO .

*Primary Examiner*—William Cumming
*Attorney, Agent, or Firm*—Andrew S. Fuller

[57] ABSTRACT

A radio communication system (100) includes equipment (112) that manages communication initiated at a subscriber unit (122) and targeted at another subscriber unit (124). At the initiating subscriber unit, a communication mode is selected (410) from among multiple communication modes supported by the target subscriber unit. A mode independent identifier is obtained (420) for the target subscriber unit, and transmitted (430) to the system equipment along with the selected communication mode. The system equipment uses information based on the mode independent identifier to access (510, 520) the target subscriber unit. The system equipment then operates to enable (530, 540) the communication mode at the target subscriber unit, and to establish (550) communication between the initiating and target subscriber units.

12 Claims, 5 Drawing Sheets

6,002,948

METHOD AND APPARATUS FOR RADIO SYSTEM WITH MODE BASED SUBSCRIBER COMMUNICATIONS

TECHNICAL FIELD

This invention relates in general to radio communication systems, and more particularly, to systems having subscriber units that support multiple communication modes.

BACKGROUND

Wireless communication systems that utilize radio frequency carriers are well known in the art. Such systems offer services such as cellular telephone service, trunked dispatch services, paging services, and others. Recently, there has been a trend to offer multiple services on a single radio communication system. Some systems support subscriber units that offer both telephone interconnect and dispatch services, or telephone interconnect and paging services, among other combinations. The development of such systems have been evolutionary in nature. New services having differing characteristics are often grafted onto existing systems. Consequently, each service tends to have different access methodologies, including identifiers, initiation sequence, and the like. For example, when a user attempts a telephone call on a subscriber unit, the user acquires a dial tone, followed by the telephone number of the target communicant. When initiating a private call in dispatch mode to the same communicant, the user selects private call mode and enters a subscriber unit's dispatch identifier to initiate communications. Additionally, when the target communicant is a subscriber unit in a different radio system, a more complex call set up procedure is often necessary.

With the increasing demand for integrated services on a single subscriber unit of a radio communication system, subscriber units capable of communicating in multiple communication modes are becoming more widely available. It is desirable to facilitate communications between subscriber units regardless of communication modes. Therefore, an improved call set up procedure is needed for multi-mode communication devices.

DETAILED DESCRIPTION OF THE PREFERRED EMBODIMENTS

The present invention provides for a simplified call procedure for communicating with subscriber units of a radio communication system regardless of communication mode. At a subscriber unit, a call is initiated by selecting a particular communication mode, and by providing a global access identifier for a target subscriber unit. The global access identifier is independent of communication mode. The particular communication mode and mode independent identifier are communicated in a request for radio service to provider equipment that manages communication services within the radio communication system. At the provider equipment, the request for radio service to the target subscriber unit is received, and information based on the global access identifier used to access the target subscriber unit. If available, the desired communication mode is enabled at the target subscriber unit and communication between the originating subscriber unit established.

Figure 1:
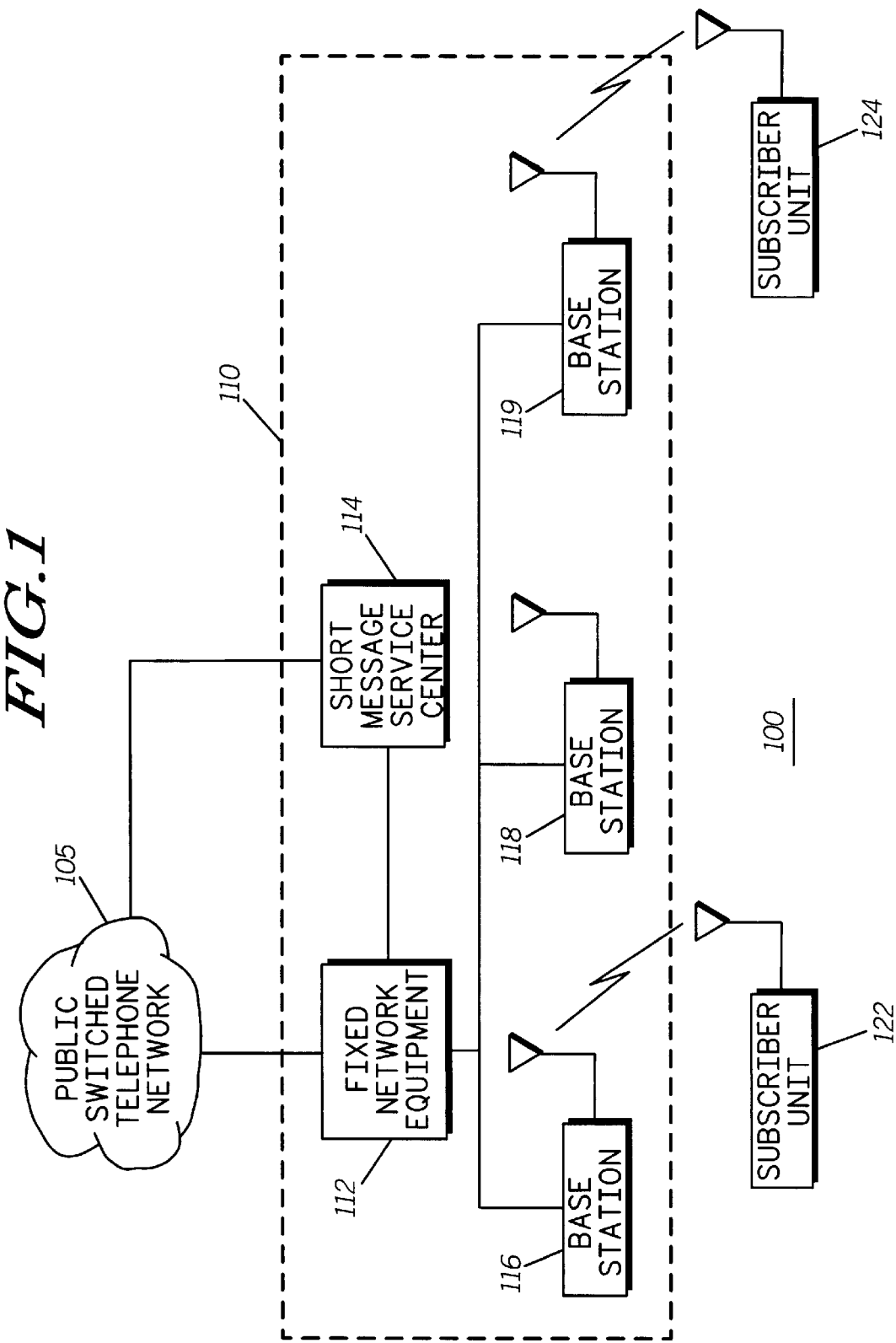
FIG. 1 is a block diagram of a radio communication system, in accordance with the present invention.

FIG. 1 shows a block diagram of a radio communication system 100, in accordance with the present invention. The radio communication system 100 includes provider equipment 110, which is coupled to a public switched network 105, and subscriber units 122, 124. The provider equipment 110 includes fixed network equipment 112, a short message service center 114, and base stations 116, 118, 119. In the preferred embodiment, the fixed network equipment 112 performs communication management and access control for the subscriber units 122, 124, in a manner well known in the art. The short message service center 114 interfaces with the public switched telephone network 105 and the fixed network equipment 112 to provide a gateway for managing and routing short messages to particular subscriber units. These messages may be obtained from a source outside the radio communication system via the public switched telephone network 105, or may be sourced from an internally serviced subscriber unit or other equipment. The base stations 116, 118, 119 are coupled to the fixed network equipment 112 and are ordinarily geographically dispersed to service subscriber units in specific geographic regions. The subscriber units 122, 124 are radio communication devices that interface with the fixed network equipment 112 via wireless communication links established with the base stations 116, 118, 119. The subscriber units may be portable or mobile radio telephones that work in conjunction with the provider equipment 110 to provide a user with services such as telephone interconnect, short message service, dispatch or instant conferencing, circuit data, packet data, and combinations thereof, as well as other data services. Ordinarily, communication between subscriber units 122, 124, or between a communicant external to the radio communication system 100 and a particular subscriber unit 122, 124, is routed through the provider equipment 110.

Figure 2:
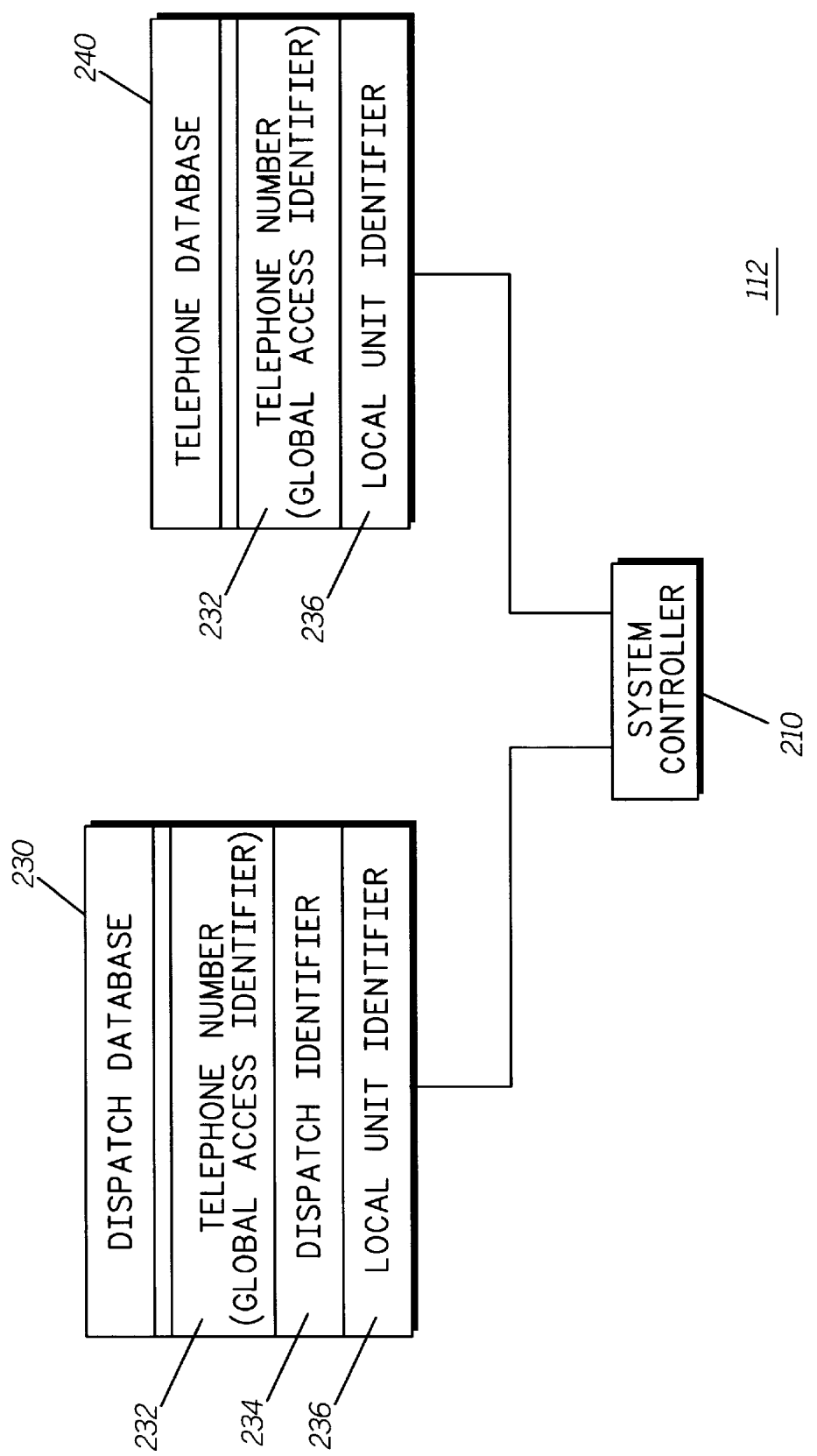
FIG. 2 is a block diagram of provider equipment within the radio communication system of FIG. 1, highlighting important functional blocks, in accordance with the present invention.

FIG. 2 is a block diagram highlighting significant aspects of the fixed network equipment 112, in accordance with the present invention. The fixed network equipment 112 of the preferred embodiment includes a system controller 210, a dispatch database 230 and telephone database 240. The system controller 210 includes hardware and software that implement management and control functions for the fixed network equipment. The dispatch database 230 contains dispatch operability information for a set of subscriber units. This information includes a record for each subscriber unit that contains a global access identifier 232, a dispatch identifier 234, and a local unit identifier 236. The global access identifier 232 has a format and content that allow a subscriber to be uniquely identified, regardless of the location of the subscriber unit within the radio communication system, and regardless of the communication mode that is used when communicating with the subscriber unit. In the preferred embodiment, the global access identifier 232 has the format of a telephone number, including any necessary geographically based codes, such as area codes, that are required to maintain a unique number for that subscriber unit. The dispatch identifier 234 is included to support other access modes, such as to maintain backwards capability when a subscriber unit is unable to communicate using the global access identifier. The local unit identifier 236 is used to allow a local system flexibility in assigning a local identifier to be associated with a particular subscriber unit. The dispatch database 230 is ordinarily maintained to include records for the set of subscriber units on which dispatch mode communication is available. The telephone database 240 contains telephone operability information for a set of subscriber units that have telephone service capability. The telephone database 240 contains global access identifiers 232, which are preferably telephone numbers, and local unit identifiers 236 for localized system management. The dispatch database 230 and telephone database 240 may contain additional information necessary for the support of the respective radio services. Additionally, other databases may be formed to support information required for other radio services, such as circuit data, packet data, and short message services. A particular subscriber unit may have records in one or more databases. Although separate databases are shown, various databases may be combined while providing the functionality according to the present invention.

Figure 3:
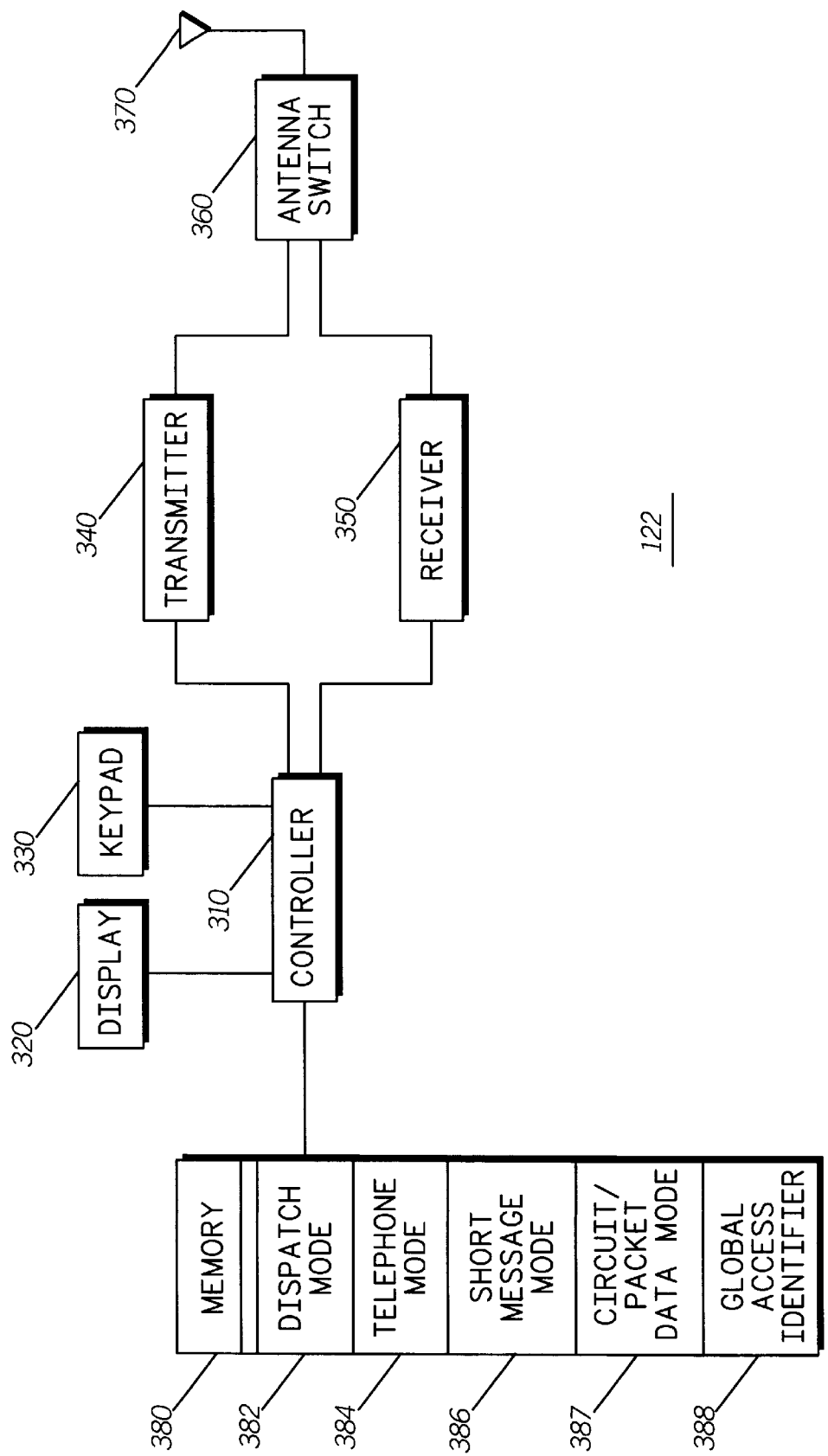
FIG. 3 is a block diagram of a radio communication device operating within the system of FIG. 1, in accordance with the present invention.

FIG. 3 shows a block diagram of a radio communication device, such as subscriber unit 122, in accordance with the present invention. Other subscriber units 124 are similarly constructed. The communication device 122 is preferably a two-way radio or radio telephone that is operable to provide telephone interconnect, paging, dispatch, and circuit/packet data services. In the radio 122, a controller 310 is coupled to a memory 380, to a transmitter 340, and to a receiver 350. The transmitter 340 and receiver 350 are coupled via an antenna switch 360 to an antenna 370. For transmit operations, the controller 310 configures the antenna switch 360 to couple the transmitter 340 to the antenna 370. Similarly, for receive operations, the controller 310 couples the antenna 370 via the antenna switch 360 to the receiver 350. The receive and transmit operations are conducted under instructions stored in the memory 380. The radio 122 also includes a display 320 and keypad 330 that together provide a user interface for accessing radio functions. The memory 380 further includes information on global access identifiers 388, and communication modes, such as dispatch 382, telephone interconnect 384, short message service 386, circuit/packet data 387, as well as other modes. The radio 122 is operable to select a particular communication mode from among dispatch mode, telephone interconnect mode, short message mode, and circuit/packet data mode, for communication with another subscriber unit. The radio 122 is also operable to transmit a selected communication mode together with a particular global access identifier to provider equipment when requesting a call setup.

Figure 4:
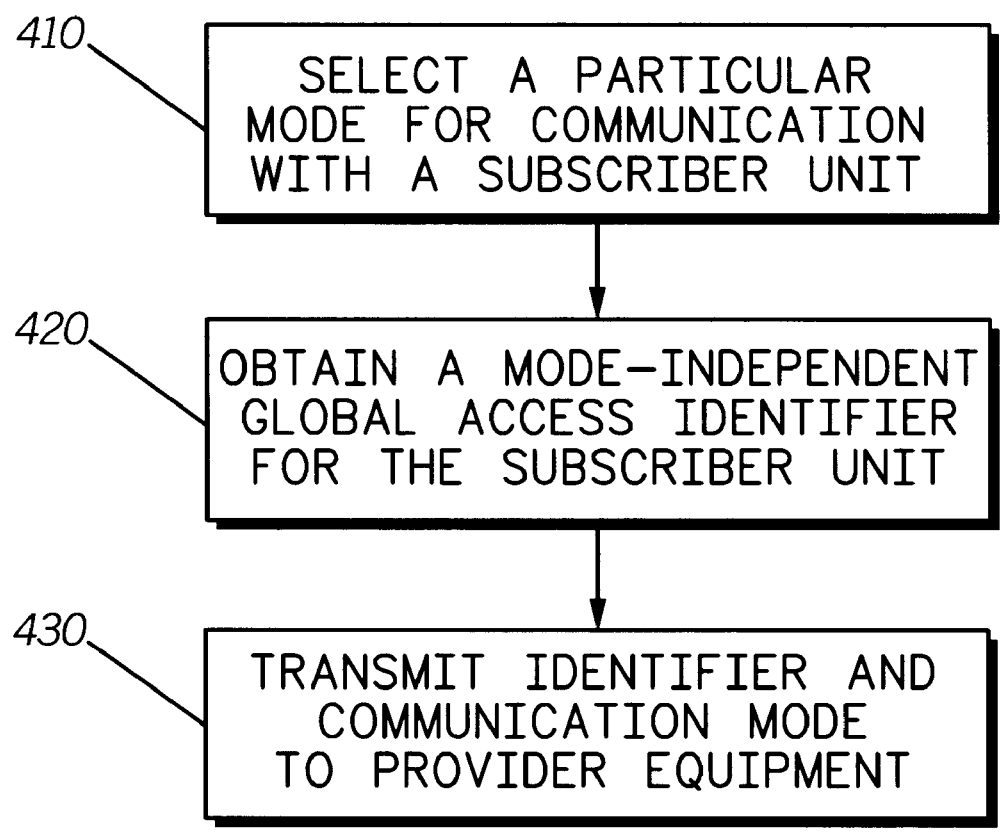
FIG. 4 is a flowchart of procedures for the radio communication device of FIG. 3, in accordance with the present invention.

FIG. 4 shows a flowchart of procedures 400 used at the communication device 122, 124 when initiating a request for radio service or communication with another subscriber unit. Ordinarily, a user operates a communication device to select a particular communication mode from among the supported communication modes for communication with another subscriber unit, step 410. The communication device obtains a mode independent global access identifier for the target subscriber unit, step 420. The global access identifier is termed mode independent as this identifier identifies the target subscriber unit independent of the selected communication mode. The global access identifier is preferably a telephone number with any necessary geographic designators, such as area codes, country codes, and the like. The communication device then transmits the global access identifier and the selected communication mode on a wireless communication channel to the provider equipment, step 430.

Figure 5:
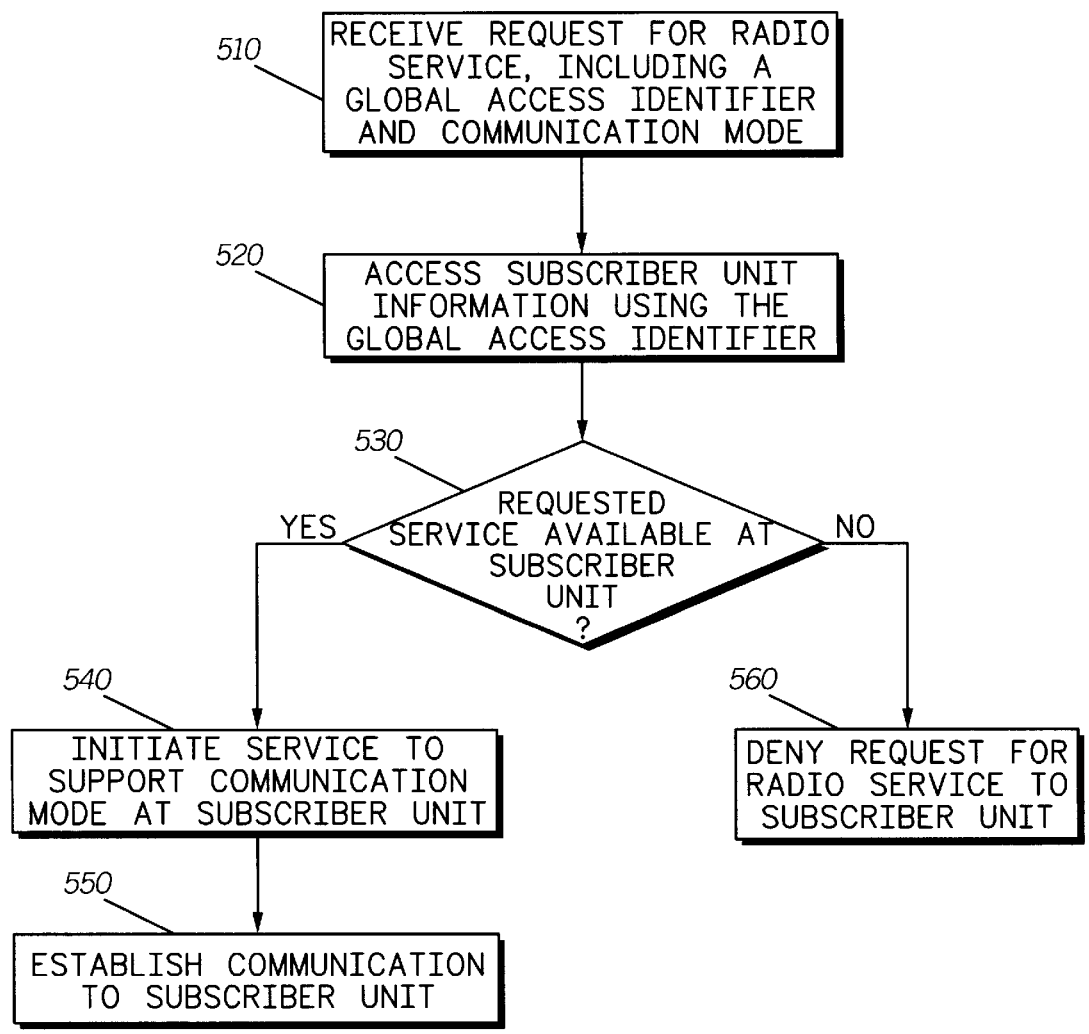
FIG. 5 is a flowchart of procedures for operating the provider equipment of FIG. 2, in accordance with the present invention.

FIG. 5 shows a flowchart of procedures 500 used at the provider equipment to process requests for communications with a particular subscriber unit, in accordance with the present invention. The provider equipment receives a request for radio service, which request includes a global access identifier and a preferred communication mode for a target subscriber unit, step 510. In one embodiment, the request is received via a wireless communication channel when sourced at a subscriber unit. However, the request may be sent via a wired communication link, particularly when the request originates outside the radio communication system. The provider equipment then accesses its databases for subscriber unit information using the global access identifier as a key, step 520. The provider equipment determines whether the preferred communication mode is available at the target subscriber unit, and denies the request for radio service when the particular communication mode is not available at the targeted subscriber unit, steps 530, 560. When the particular communication mode is available at the target subscriber unit step 530, the provider equipment accesses the target subscriber unit and initiates service to support the communication mode at the subscriber unit, step 540. Ordinarily, the provider equipment enables the communication mode at the target subscriber unit, and establishes communication with that subscriber unit, step 550. Generally, when the radio service request originates from a subscriber unit and the request targets another subscriber unit, the provider equipment establishes communication between the originating subscriber unit and the target subscriber unit.

The present invention offers significant advantages over the prior art of record. Communication to a particular subscriber unit is enabled using a global access identifier which uniquely identifies the subscriber unit within the radio communication system. Thus, a single access identifier may be used, regardless of communication mode, when communication is desired with a particular subscriber unit. As a result, communication services can be provided in a more integrated manner.

What is claimed is:

1. In a radio communication system having provider equipment, and first and second subscriber units, a method comprising the steps of:
    at the first subscriber unit:
        selecting a particular communication mode from among a plurality of communication modes supported by the second subscriber unit;
        obtaining a mode independent identifier for the second subscriber unit, which mode independent identifier identifies the second subscriber unit independent of a selected communication mode;
        transmitting the mode independent identifier and the particular communication mode on a communication channel to the provider equipment;
    at the provider equipment:
        receiving the mode independent identifier and the particular communication mode;
        accessing the second subscriber unit using information based on the mode independent identifier;
        enabling the particular communication mode at the second subscriber unit; and
        establishing communication between the first and second subscriber units.

2. The method of claim 1, wherein the step of selecting a particular communication mode comprises the step of selecting from a plurality of communication modes comprising telephone communication mode and circuit data mode.

3. The method of claim 1, wherein the step of selecting a particular communication mode comprises the step of selecting from a plurality of communication modes comprising telephone communication mode and packet data mode.

4. The method of claim 1, wherein the step of selecting a particular communication mode comprises the step of selecting from a plurality of communication modes comprising telephone communication mode and dispatch communication mode.

5. The method of claim 4, wherein the mode independent identifier comprises a telephone number.

6. The method of claim 4, wherein the step of accessing the second subscriber unit comprises the steps of:
   obtaining a communication mode dependent identifier using the mode independent identifier and the particular communication mode; and
   initiating communications with the second subscriber unit using the communication mode dependent identifier.

7. In a radio communication system having fixed network equipment, and first and second subscriber units, a method comprising the steps of:
   at the first subscriber unit:
      selecting a communication mode from among a dispatch communication mode and telephone communication mode for communicating with the second subscriber unit;
      obtaining an identifier for the second subscriber unit, which identifier identifies the second subscriber unit in any communication mode selected;
      transmitting the identifier and the communication mode on a wireless communication channel to the fixed network equipment;
   at the fixed network equipment:
      receiving the identifier and the communication mode over the wireless communication;
      accessing the second subscriber unit using the identifier;
      initiating service to support the communication mode at the second subscriber unit; and
      enabling communication between the first and second subscriber units.

8. A radio communication system having subscriber units, and interfacing with a telephone network, comprising:
   provider equipment operably coupled to the telephone network and comprising a first database that contains telephone operability information for a first set of subscriber units, the first database including global access identifiers that represent the first set of subscriber units, the provider equipment further comprising a second database that contains dispatch operability information for a second set of subscriber units, the second database including global access identifiers that represent the second set of subscriber units;
   a first subscriber unit selectively operable in dispatch mode, and in telephone communication mode, the first subscriber unit having a particular global access identifier associated with the dispatch mode and with the telephone communication mode; and
   a second subscriber unit operable to select a particular communication mode from among dispatch mode, and telephone communication mode for communication with the first subscriber unit, and to transmit the particular communication mode together with the particular global access identifier to the provider equipment;
   wherein the provider equipment is responsive to the particular communication mode and to the particular global access identifier to access the first database or the second database to enable communication between first and second subscriber units.

9. In a two-way communication system having provider equipment, and first and second subscriber units that supports a plurality of communication modes, a method comprising the steps of:
   at the subscriber unit:
      selecting a particular communication mode from among a plurality of communication modes supported by the second subscriber unit, wherein the particular communication mode indicates a type of communication link to be established between the first and second subscriber units;
      obtaining a mode independent identifier for the second subscriber unit, which mode independent identifier identifies the second subscriber unit independent of the communication mode selected from among the plurality of communication modes; and
      transmitting the mode independent identifier and the particular communication mode on a communication channel to the provider equipment.

10. The method of claim 9, wherein the particular communication mode is selected from among a telephone communication mode, a dispatch communication mode, and a short message communication mode.

11. The method of claim 9, wherein the communication mode is selected from among a telephone communication mode, and a circuit data mode.

12. The method of claim 9, wherein the communication mode is selected from among a telephone communication mode, and a packet data mode.

* * * * *